United States Patent
Rhee et al.

(10) Patent No.: US 8,557,148 B2
(45) Date of Patent: Oct. 15, 2013

(54) METHOD FOR FABRICATING SINTERED ANNULAR NUCLEAR FUEL PELLET THROUGH ROD-INSERTED SINTERING

(75) Inventors: Young-Woo Rhee, Daejeon (KR); Dong-Joo Kim, Daejeon (KR); Jong-Hun Kim, Daejeon (KR); Jae-Ho Yang, Daejeon (KR); Ki-Won Kang, Daejeon (KR); Chill-Sun Ryu, legal representative, Daejeon (KR); Keon-Sik Kim, Daejeon (KR); Kun-Woo Song, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 469 days.

(21) Appl. No.: 12/871,347

(22) Filed: Aug. 30, 2010

(65) Prior Publication Data
US 2011/0121473 A1 May 26, 2011

(30) Foreign Application Priority Data
Nov. 23, 2009 (KR) .................. 10-2009-0113245

(51) Int. Cl.
*G21C 21/02* (2006.01)
*C04B 33/32* (2006.01)

(52) U.S. Cl.
USPC .................. 264/0.5; 264/632; 264/672

(58) Field of Classification Search
USPC .................................. 264/672, 632
See application file for complete search history.

(56) References Cited

U.S. PATENT DOCUMENTS

| 3,504,058 | A | * | 3/1970 | Masselot ................. 264/0.5 |
| 3,928,132 | A |   | 12/1975 | Bujas |
| 3,949,027 | A | * | 4/1976 | Flipot et al. ................ 264/0.5 |
| 4,014,968 | A | * | 3/1977 | Simon ..................... 264/630 |
| 4,869,868 | A |   | 9/1989 | Lay et al. |
| 5,762,838 | A | * | 6/1998 | Ohmuta et al. ........... 264/0.5 |
| 2005/0261136 | A1 | | 11/2005 | Rhee et al. |

FOREIGN PATENT DOCUMENTS

| JP | 02095298 A | 4/1990 |
| JP | 05045484 A | 2/1993 |
| JP | 05072384 A | 3/1993 |
| JP | 07055975 A | 3/1995 |
| JP | 7074833 B2 | 8/1995 |
| JP | 2588947 B2 | 12/1996 |
| JP | 11202073 A | 7/1999 |

(Continued)

OTHER PUBLICATIONS

Bae, Ki-Kwang et al., "Characterization and comparison of the sintering behaviors of the variously-treated UO2 powders", Annual International Conference—Canadian Nuclear Association, 1992, pp. 8.24-34, Abstract (1 page).

(Continued)

*Primary Examiner* — Joseph S Del Sole
*Assistant Examiner* — Erin Snelting
(74) *Attorney, Agent, or Firm* — The Webb Law Firm

(57) ABSTRACT

A method for fabricating a sintered annular nuclear fuel pellet includes: molding nuclear fuel powder or granules to fabricate an annular nuclear fuel green body; inserting a rod-like shaped structure into the annular nuclear fuel green body; sintering the rod-like shaped structure-inserted annular nuclear fuel green body in a reductive gas atmosphere; and separating the sintered annular nuclear fuel pellet from the rod-like shaped structure.

9 Claims, 6 Drawing Sheets

(56) References Cited

FOREIGN PATENT DOCUMENTS

| KR | 19970003283 A | 1/1997 |
| KR | 20050110757 A | 11/2005 |
| WO | 9701174 A1 | 1/1997 |

OTHER PUBLICATIONS

Saidy, Madiba et al., "Thermal diffusion of iodine in UO2 and UO2+x", Journal of Nuclear Materials, 2008, pp. 405-415, vol. 372, Elsevier B.V.

Rhee, Young Woo et al., "Diametric Tolerance Control of Dual Cooled Annular Fuel Pellet without Inner Surface Grinding", Proceedings of Top Fuel 2009, Paris, France, Sep. 6-10, 2009, Paper 2075, pp. 1222-1225.

Rhee, Young Woo et al., "Effect of Granule Size on Diametric Tolerance of Annular Fuel Pellet", Transactions of the Korean Nuclear Society Spring Meeting, Gyeongiu, Korea, May 29-30, 2008, 2 pages.

Somayajulu, P.S. et al., "Development of annular pellet production techniques for PFBR fuel", International Conference on Advances in Powder Materials Processing in Nuclear, Space, Defence and Industrial Sectors, Hyderabad, India, Mar. 23-25, 1999, Abstract.

Minakawa, Susumu et al., "Report of annular pellet fabrication technology development, Outlines of development program and interim result", Saikuru-Kiko-Giho (Jun. 2000), No. 7, pp. 19-30, Abstract (1 page).

German, Randall M., "Green body homogeneity effects on sintered tolerances", Powder Metallurgy, 2004, vol. 47, No. 2, pp. 157-160.

* cited by examiner

US 8,557,148 B2

METHOD FOR FABRICATING SINTERED ANNULAR NUCLEAR FUEL PELLET THROUGH ROD-INSERTED SINTERING

CROSS-REFERENCE TO RELATED APPLICATIONS

This application claims the priority of Korean Patent Application No. 10-2009-0113245 filed on Nov. 23, 2009, in the Korean Intellectual Property Office, the disclosure of which is incorporated herein by reference.

BACKGROUND OF THE INVENTION

1. Field of the Invention

The present invention relates to a sintered annular nuclear fuel pellet and, more particularly, to a method for fabricating a sintered annular nuclear fuel pellet without performing an inner side grinding process so that the sintered annular nuclear fuel pellet can be used for a dual-cooling nuclear fuel rod that heat transfer simultaneously occurs at the inner and the outer claddings.

2. Description of the Related Art

In general, a uranium dioxide ($UO_2$) pellet is the most commonly used nuclear fuel for a commercial nuclear reactor. A $UO_2$ pellet contains a certain amount (e.g., 1 wt % to 5 wt %) of $U^{235}$ and, while it is in use in a nuclear reactor, $U^{235}$ within the $UO_2$ pellet reacts with a neutron, generating nuclear fission energy. The pellet (i.e., the sintered pellet) of a light-water reactor nuclear fuel has a cylindrical shape (e.g., having a diameter of about 8 mm and a length of about 10 mm). The centers of the upper and lower surfaces of the cylinder are dished up and the edges of the upper and lower surfaces are chamfered so as to have a flat chamfer.

In general, the sintered nuclear fuel pellet is used in cylindrical rod form in such a manner that it is charged in a zirconium alloy cladding tube having a certain length (e.g., about 4 m) in the commercial nuclear reactor. Such a commercial nuclear fuel rod is limited in its performance in terms of temperature and heat flux.

The $UO_2$ pellet (i.e., the sintered pellet) has many advantages as a nuclear fuel, but its thermal conductivity is low, compared with a metal or nitride nuclear fuel, failing to quickly transfer heat generated according to nuclear fission to cooling water, and the pellet therefore has a much higher temperature than that of the cooling water during operations. For example, the cooling water has a temperature ranging from 320 degrees Celsius to 340 degrees Celsius, while the pellet has the highest temperature at its center and the lowest temperature at its surface. The temperature at the center of a pellet of a normally burned nuclear fuel rod ranges from 1,000 degrees Celsius to 1,500 degrees Celsius.

The pellet remaining at a high temperature results in an encroachment on a margin for safety in the occurrence of various design basis nuclear reactor accidents. For example, in the occurrence of a loss of coolant accident, the safety margin becomes smaller, as the temperature of the nuclear fuel immediately before the accident is high. Also, when the heat flux of the nuclear fuel rod increases, a departure of nucleate boiling may occur. The occurrence of the departure of nucleate boiling leads to the formation of an air bubble curtain on the surface of the cladding tube, severely degrading heat transmission and potentially damaging the nuclear fuel rod.

In an effort to solve the problem, an annular nuclear fuel rod (U.S. Pat. No. 3,928,132 entitled 'Annular fuel element for high temperature reactor' by Roko Bujas in 1975) was proposed, which includes an outer cladding tube 11, an inner cladding tube 12 coaxially disposed with the outer cladding tube 11 and having a diameter smaller than that of the outer cladding tube 11, and an annular pellet 15 charged between the outer cladding tube 11 and the inner cladding tube 12 as illustrated in FIG. 1 and FIG. 2.

The related art annular nuclear fuel rod 10 allows a coolant to additionally flow along the center having the highest temperature in the cylindrical commercial nuclear fuel rod, so the average temperature of the nuclear fuel rod can be significantly reduced. In addition, because the heat transfer area per nuclear fuel rod is drastically increased to reduce heat flux, so the thermal margin can be improved.

However, heat generated from the annular pellet of the related art annular nuclear fuel rod is transferred to the coolant through the both sides of the inner cladding tube and the outer cladding tube, so if a large amount of heat is transferred to one side, heat transferred to the other side is reduced by as much. The amount of generated heat transferred via either of the inner and outer cladding tubes has a connection with the thermal resistance of both directions, so a larger amount of heat is distributed to the cladding tube having a smaller thermal resistance, causing a problem in that the thermal flux of one cladding tube becomes higher than that of the other cladding tube.

About a half of the thermal resistance present in the annular nuclear fuel rod is taken up by the thermal resistance of gaps existing between the pellet and the inner and outer cladding tubes, and in this case, the thermal resistance of the gap is proportional to the size of the gap.

In order to reduce the thermal resistance of the gaps de and di between the annular pellet 15 and the cladding tubes 11 and 12 after fabrication, the gaps are set to be as small as possible within a fabrication range (e.g., 50 μm to 100 μm). Recently, a reduction of the internal gap to below 34 μm has been proposed as a solution to the asymmetry of the heat flux.

Thus, in order to obtain a desired gap size, accurate adjusting of the dimensions of the inner and outer diameters of the annular pellet and precise controlling of the dimensional tolerance are crucial in terms of the fabrication of the annular pellet.

In the process of manufacturing the commercial nuclear fuel pellet, a nuclear fuel powder or granule is charged in a mold and then pressed by pressing a vertical molding punch through double acting uniaxial pressing to fabricate a green body compact (or a green body), and then, the green body is sintered. The green body fabricated through the double acting uniaxial pressing is sintered to be deformed such that the diameter of a central portion is smaller than the diameters of the upper and lower portions, for example, in a shape such as a double-headed drum having a narrow waist, or an hourglass. Thus, the sintered body undergoes a centerless grinding process in order to have a uniform diameter along the length of the pellet.

Compacting process variables affecting the dimension and shape of the sintered pellet include a variation in a green density among various green bodies due to the difference in the amount of powder introduced into the mold during an auto-molding process, a non-uniform green density distribution in a single green body caused by frictional contact on the wall of the molding frame, and the like.

First, as for the variation of the dimension of a pellet due to the difference in green densities among various green bodies, R. M. German (Powder Metallurgy 2004, Vol. 47, No. 2 pp 157-160) revealed that, provided the pressing conditions and sintering conditions are the same, when the dimension of a green body is the same, a green density can be represented by the weight of the green body and there is a relationship such as that expressed by Equation (1) shown below between variations of the weight of the green body and the dimension of the sintered pellet.

$$\frac{\text{green mass variation}}{\text{mean mass}} \leq 3\frac{\text{tolerance}}{\text{mean size}} \quad \text{[Equation (1)]}$$

Namely, it means that, in order to obtain a dimensional tolerance of ±0.2 percent between sintered bodies, the variation of the weight of the green body needs to be adjusted to be ±0.6 percent or less. However, because there is the potential for another process variable influence in an actual process, the variation of the weight of the green body needs to be controlled more minutely. For example, in the above-mentioned document, the variation of the weight of the green body is adjusted to be 0.2 percent or less in the uniaxial pressing process to maintain the dimensional tolerance of the sintered body within the range from ±0.14 percent to ±0.20 percent.

Next, the non-uniformity of the green density in a single green body causes a sintering deformation in the shape of a double-headed drum with a narrow waist or an hourglass. The difference in the green density in the green body causes a difference in the sintering shrinkage of each part of the green body during sintering, triggering deformation and even cracking in a worst case scenario.

FIG. 3 is a schematic view showing a green density distribution within the green body and the shape of a sintered pellet (pellet) according to a pressing direction.

With reference to FIG. 3, a molding device 30 includes a molding frame 32 and an upper punch 31a and a lower punch 31b disposed at upper and lower portions of the molding frame 32. A non-uniform density distribution caused by pressing results from a friction (F1) between powder 25 and the molding frame 32 and a friction (F2) between powder grains 25.

The pressure applied to the surface of the powder 25 filling the molding frame 32 by the pressing punches 31a and 31b is lost due to friction. Thus, in the powder disposed away from the punched surface, the actual working force is reduced compared to the applied pressure. The less-compressed area has a lower green density than that of an area to which a higher pressure is applied. The low-density area is incompletely densified or greatly shrunken compared with other neighboring areas.

A cylindrical-type sintered pellet can obtain precise dimensional tolerance with a certain outer diameter through centerless grinding, but in the case of a sintered annular pellet, both the outer surface and inner surface would be deformed, so both inner and outer diameters would require grinding. General centerless grinding can resolve only the tolerance of an outer diameter and an outer diameter dimension.

In order to adjust the tolerance with an inner diameter dimension, the inner side of the sintered pellet needs to be ground. For the inner side grinding, precise grinding using a diamond wheel or sandblasting process may be performed. In this respect, however, because the inner diameter distribution of the sintered annular pellet is different for each sintered pellet, in case of the diamond wheel grinding, the sintered annular pellets must be held one by one and ground, unlike centerless grinding, resulting in the degradation of productivity.

In general, inferior or defective products or grinding residues or remnants, namely, those containing high-priced enriched uranium generated from the nuclear fuel fabrication process, are powdered through an oxidation process or the like so as to be recycled. However, in case of sandblasting, uranium and sand are mixed with the grinding residues, thereby making it difficult to recycle the costly uranium content. Thus, a problem arises in separating the uranium from the grinding residues and controlling the impurity contents.

SUMMARY OF THE INVENTION

An aspect of the present invention provides a method for fabricating a sintered annular nuclear fuel pellet capable of maintaining a uniform value of an inner diameter of a sintered annular nuclear fuel pellet and maintaining a low level (±13 µm, the current specification of a dimensional tolerance of a commercial nuclear fuel pellet, or lower) of inner diameter tolerance with respect to the length (in the direction of a central axis) of the pellet, without performing a disadvantageous grinding process.

According to an aspect of the present invention, there is provided a method for fabricating a sintered annular nuclear fuel pellet, the method including: pressing nuclear fuel powder or granules to fabricate an annular nuclear fuel green body; inserting a rod-like shaped structure into the annular nuclear fuel green body; sintering the rod-like shaped structure-inserted annular nuclear fuel green body in a reductive gas atmosphere; and separating the sintered annular nuclear fuel pellet from the rod-like shaped structure.

The annular nuclear fuel green body may have a green density distribution changing in an axial direction.

The rod-like structure may have a coefficient of thermal expansion which is equal to or greater than that of the nuclear fuel pellet. For example, the rod-like structure may have a coefficient of thermal expansion ranging from $9.0 \times 10^{-6}$/K to $15.0 \times 10^{-6}$/K under the conditions of the sintering operation.

The rod-like structure may include a material selected from the group consisting of $UO_2$, $ThO_2$, $PuO_2$, and MgO.

The diameter of the rod-like structure may be equal to or greater than the largest inner diameter of the annular nuclear fuel pellet sintered without the rod-like structure inserted therein.

The method may further include: performing centerless-grinding on an outer surface of the separated annular nuclear fuel pellet such that the annular nuclear fuel pellet has a uniform outer diameter in an axial direction.

In a different particular exemplary embodiment, the reductive gas may be a hydrogen gas. However, without being limited thereto, the reductive gas may be a mixture of gases obtained by mixing at least one selected from the group consisting of carbon dioxide, vapor, and an inert gas with a hydrogen gas.

The sintering may be performed at a temperature ranging from 1,500 degrees Celsius to 1,800 degrees Celsius.

The nuclear fuel powder or granule may be a ceramic material comprising one or more fissile materials selected from the group consisting of uranium, plutonium, and thorium.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
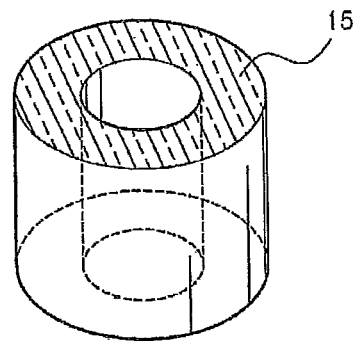
FIG. 1 is a schematic perspective view showing a general sintered annular nuclear fuel pellet.
Figure 2:
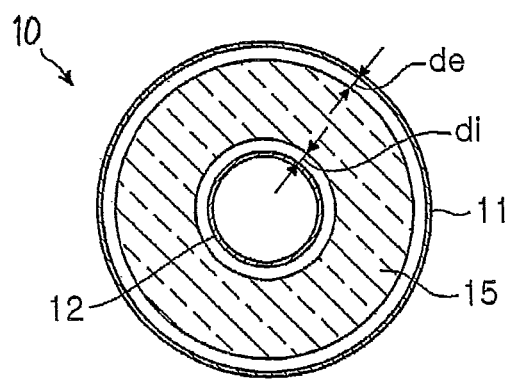
FIG. 2 is a sectional view of a dual-cooling annular nuclear fuel rod employing the sintered annular nuclear fuel pellet illustrated in FIG. 1.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

The present invention proposes a method for fabricating a sintered annular nuclear fuel pellet having an inner diameter of a uniform size and a small inner diameter tolerance by employing a method of sintering a rod-like shaped structure having a precisely machined outer diameter dimension in a state of being insertedly positioned within an annular green body.

An outer diameter of the rod-like shaped structure may have a dimension corresponding to an inner diameter required by specifications of a sintered annular nuclear fuel pellet, and may need to have a dimensional stability maintained under annular nuclear fuel sintering conditions.

The rod-like shaped structure serves to restrain an annular green body from being additionally contracted (shrunken) in its inner diameter at a point in time when the annular green body is brought into contact with the rod-like shaped structure while being contracted during sintering, to thereby uniformly maintain the inner diameter of the sintered annular pellet.

Also, the rod-like shaped structure serves to correct the difference in green density between annular green bodies or the difference in a sintering shrinkage resulting from a fine change in sintering conditions and restrain a non-uniform sintering deformation according to a green density distribution in a single green body.

The exemplary embodiments of the present invention will now be described in detail with reference to the accompanying drawings.

Figure 4A:
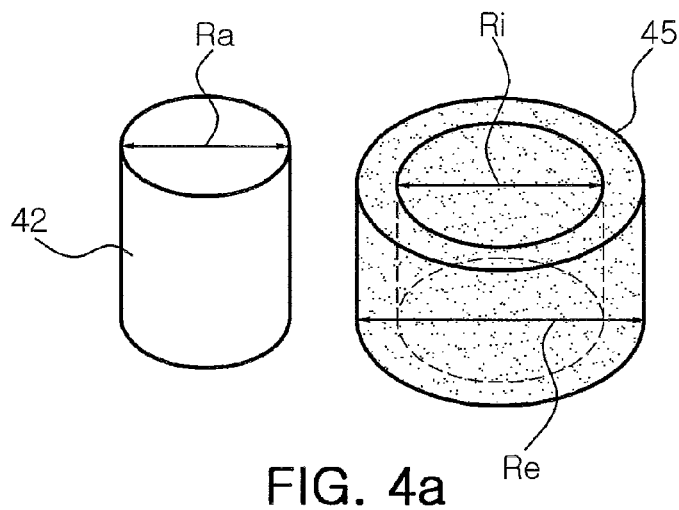
FIGS. 4(a) to 4(c) are schematic views showing the states of an annular nuclear fuel in each process for explaining a method for fabricating a sintered annular pellet according to an exemplary embodiment of the present invention.
Figure 4B:
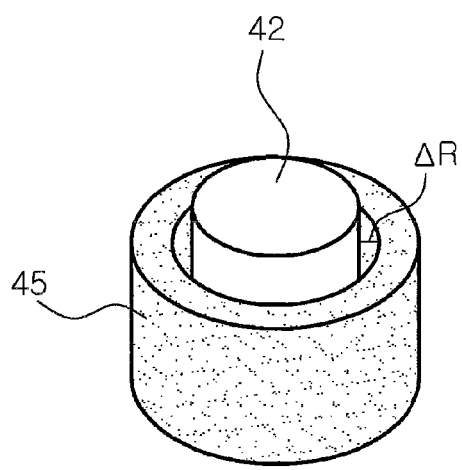
Figure 4C:
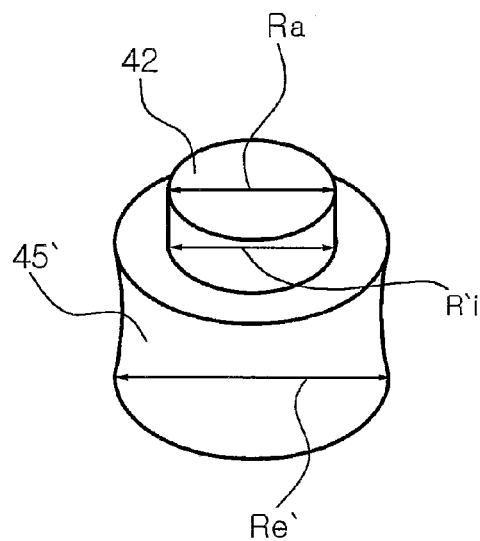

FIGS. 4(a) to 4(c) are schematic views showing the states of an annular nuclear fuel in each process for explaining a method for fabricating a sintered annular pellet according to an exemplary embodiment of the present invention. FIGS. 5(a) to 5(f) are sectional views showing the states of the annular nuclear fuel in each process for explaining a method for fabricating a sintered annular pellet according to an exemplary embodiment of the present invention.

FIG. 4a shows a rod-like structure 42 and an annular green body 45 fabricated by molding nuclear fuel granule.

With reference to FIG. 4a, the rod-like structure 42 that can be employed in the present exemplary embodiment is a structure processed to have a precise outer diameter dimension (Ra) and may have a coefficient of thermal expansion equal to or greater than that of a sintered nuclear fuel pellet. For example, the rod-like structure 42 may have a coefficient of thermal expansion ranging from $9.0 \times 10^{-6}$/K to $15.0 \times 10^{-6}$/K under sintering conditions.

Meanwhile, preferably, the diameter (Ra) of the rod-like structure 42 is equal to or greater than the largest portion of the inner diameter (Ri) of the sintered annular nuclear fuel pellet, in a state that the rod-like structure 42 is not inserted.

Also, preferably, the rod-like structure 42 employed in the present exemplary embodiment is made of a material having such a high temperature strength as not to cause a dimensional deformation due to a thermal variation and sintering pressure required in the processes (i.e., sintering process).

For example, the rod-like structure 42 may be made of a material selected from the group consisting of $UO_2$, $ThO_2$, $PuO_2$, and MgO.

Figure 3:
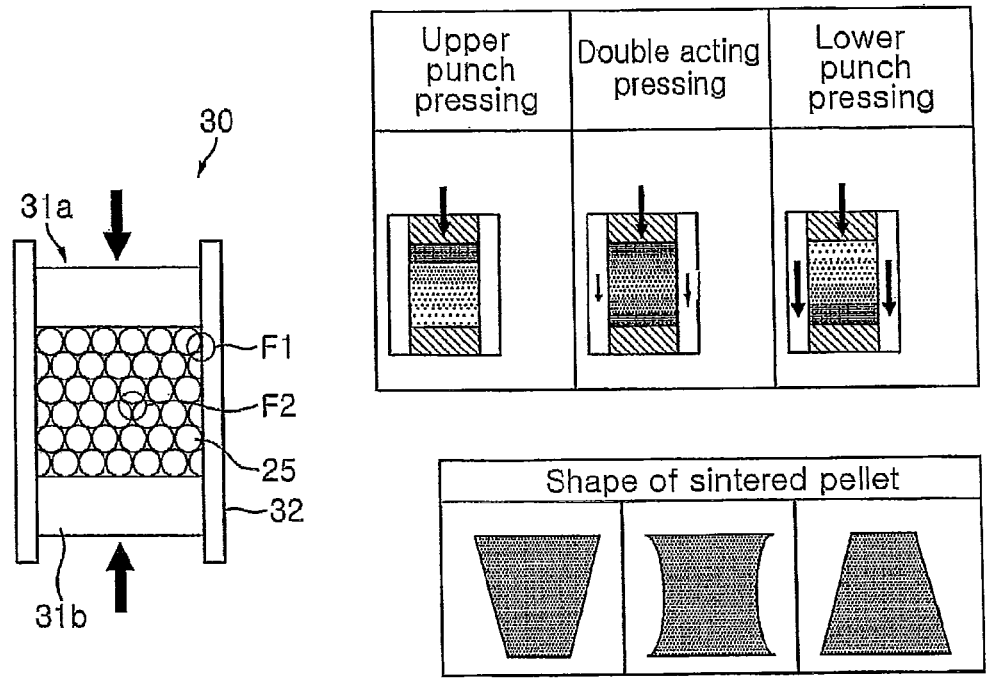
FIG. 3 is a schematic view showing a green density distribution within a green body and the shape of a sintered pellet (pellet) according to a pressurizing direction.

The nuclear fuel green body 45 illustrated in FIG. 4a is an annular structure having an outer diameter (Re) and an inner diameter (Ri) obtained by molding nuclear fuel powder or granules. In general, as described above with reference to FIG. 3, the annular nuclear fuel green body 45 has a green density distribution which varies along an axial direction according to a pressing direction during molding. The fabrication method according to the present invention can be advantageously employed for the annular nuclear fuel green body 45 having the green density distribution varying along the axial direction. This will be described in detail with reference to FIGS. 4b and 5a.

The annular nuclear fuel green body employed in the present exemplary embodiment may be plutonium dioxide ($PuO_2$), thorium dioxide ($ThO_2$), nuclear materials having the same lattice structure as, for example, $UO_2$, as well as uranium.

Subsequently, as shown in FIG. 4b, the rod-like structure 42 is inserted into the annular nuclear fuel green body 45. In this case, there may be a gap (ΔR) by the difference between the inner diameter (Ri) of the annular nuclear fuel green body and the diameter (Ra) of the rod-like structure.

As discussed above, the green density distribution varies along the axial direction according to a pressing direction during molding. The annular nuclear fuel green body 45 illustrated in FIG. 5a was obtained through a double acting pressing, having a form such that a green density in the middle portion is lower than those of both end portions.

Next, with the rod-like structure inserted, the annular nuclear fuel green body is sintered in a reductive gas atmosphere.

The sintering process may be performed at a temperature ranging from 1,500 degrees Celsius to 1,800 degrees Celsius. Also, the reductive gas employed in this process may be a hydrogen gas, but the present invention is not limited thereto. Namely, the reductive gas may be a gas obtained by mixing a hydrogen gas with at least one selected from the group consisting of carbon dioxide, a vapor, and an inert gas.

FIG. 4c shows the result obtained through the sintering process. As shown in FIG. 4c, the rod-like structure 42 has little deformation, maintaining almost the same diameter (Ra) as that before the sintering process, while the sintered annular nuclear fuel pellet 45' obtained by sintering the green body 45 has the reduced outer diameter (Re'), reduced inner diameter (R'i), and reduced length. In particular, after finishing the sintering process, an inner surface of the pellet 45' is tightly attached to the surface of the rod-like structure 42.

Figure 5C:
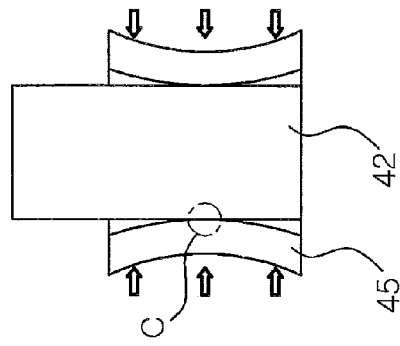
FIGS. 5(a) to 5(f) are sectional views showing the states of the annular nuclear fuel in each process for explaining a method for fabricating a sintered annular pellet according to an exemplary embodiment of the present invention.
Figure 5F:
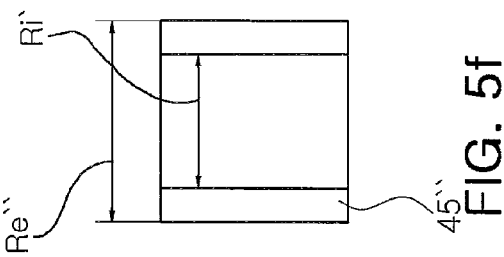
Figure 5B:
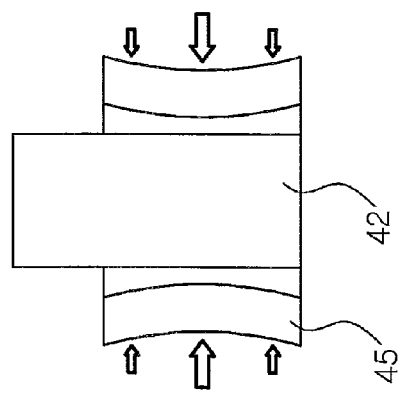
Figure 5E:
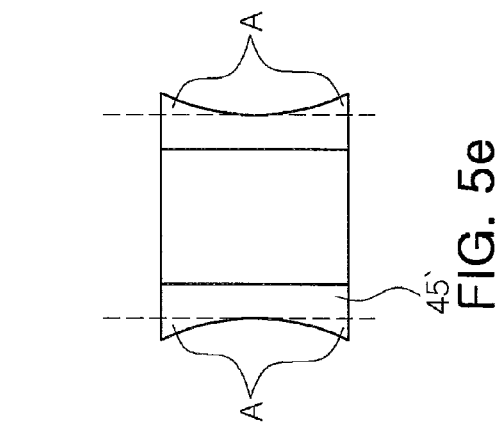
Figure 5A:
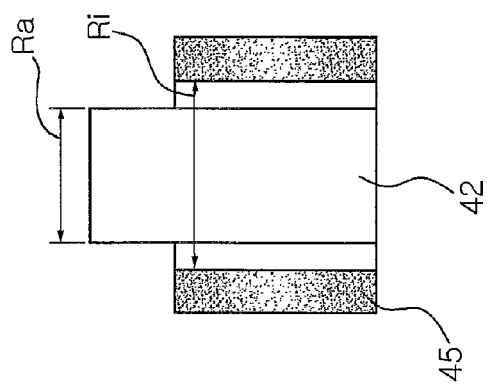
Figure 5D:
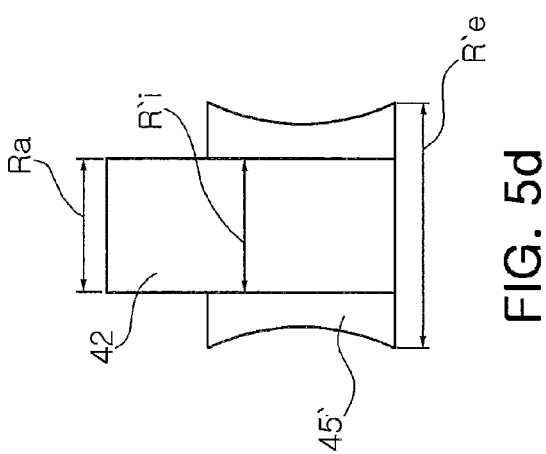

The contraction of the green body 45 in the sintering process is illustrated in detail in FIGS. 5b to 5d.

As shown in FIGS. 5b to 5d, when the annular green body 45 with the rod-like structure 42 inserted therein is heated, the annular green body 45 is sintered as temperature goes up, so the outer diameter (Ra), the inner diameter (Ri), and the length of the annular sintered body are contracted.

In this embodiment, the middle portion of the annular green body has a low green density than those of the both end portions of the annular green body, so the middle portion is more contracted as shown in FIG. 5b (it is contracted as much as the size of the arrows).

Subsequently, as shown in FIG. 5c, the middle portion of the annular green body is first brought into contact with the surface of the rod-like structure 42. The contacted portion (C) will not be contracted any further, maintaining a uniform diameter, and as the sintering is proceeding, other portions (i.e., both end portions) are contracted to have the inner diameter (Ri') reduced until such time as they are brought into contact with the surface of the rod-like structure 42.

After the sintering process is completed, the inner side surface of the pellet 45' is entirely in contact with the rod-like structure as shown in FIG. 5d (which corresponds to FIG. 4c). With sintering completed, the outer side surface of the inserted rod-like structure 42 and the inner side surface of the annular pellet 45' are in contact with a very small gap therebetween, so, if the coefficient of thermal expansion of the rod-like structure 42 is smaller than that of the annular pellet 45', a tensile stress would possibly be applied to the annular pellet during cooling from the sintering temperature to room temperature, generating crack. Thus, preferably, the coefficient of thermal expansion of the rod-like structure is equal to or greater than that of the annular pellet.

Next, when the annular pellet 45' is separated from the rod-like structure 42, the annular nuclear fuel pellet 45' having a uniform inner diameter distribution as shown in FIG. 5e can be obtained.

As a result, the annular nuclear fuel pellet 45' illustrated in FIG. 5e has a uniform inner diameter (Ri') at every portion, narrow inner diameter distribution over the lengthwise direction of the pellet and small dimensional tolerance. Thus, the inner diameter dimensional tolerance can be improved to be below 13 μm even without performing a grinding process on the inner surface of the pellet 45'.

In addition, because portions (A) of the pellet are removed through an outer diameter centerless grinding process to obtain a uniform outer diameter, the annular nuclear fuel rod 45" having even the uniform outer diameter dimension (Re") can be obtained.

In this manner, the inner and outer gap of the annular nuclear fuel rod 45" can be precisely adjusted and, in addition, the imbalance of heat flux of the annular nuclear fuel rod 45" can be solved.

The object, a technical configuration and an operational effect of the present invention will now be described in detail by using an exemplary embodiment of the present invention.

Embodiment

IDR-UO$_2$ powder was preliminarily formed with a pressure of 0.1 ton/cm$^2$ into a mass, and the mass was crushed and allowed to pass through a 50-mesh sieve to fabricate granules. 0.3 wt % of zinc state was added as a lubricant to the fabricated granules, which were then mixed in a tubular mixer for 30 minutes.

The thusly mixed granules were charged (i.e., loaded) in a double acting uniaxial press and pressed with a pressure of about 4 ton/cm$^2$ to fabricate an annular green body. The inner and outer diameters of the annular green body were measured at intervals of 1 mm along the length of the green body by using a contact type three-dimensional measurement machine. The density of the annular green body was at a level of about 54 percent of the level of a theoretical density.

The annular green body with a UO$_2$ rod having an outer diameter of 10.18 mm inserted therein was sintered in a hydrogen atmosphere for 12 hours at a temperature of 1,600 degrees Celsius. The density of the sintered annular body was measured by using Archimedes' method, and the inner and outer diameters of the sintered annular body were measured at intervals of 1 mm along the length of the sintered body by using a contact type three-dimensional measurement machine. The density of the sintered annular body was about 96% of a theoretical density. The inner diameters, outer diameters, and tolerances of the annular sintered body according to the Embodiment are shown in Table 1 below.

As noted in Table 1, an inner diameter dimensional tolerance according to the method for fabricating a sintered annular pellet is ±6 or 7 μm, so the sintered annular body having an inner diameter dimensional tolerance ±13 μm or less as in the specifications of a commercial sintered nuclear fuel pellet can be fabricated without performing a grinding process. It is also noted that the inner diameters of sintered bodies are uniformly maintained according to the results obtained by repeatedly fabricating first and second sintered bodies, and the like.

TABLE 1

| | Inner diameter (mm) | | Outer diameter (mm) | |
| --- | --- | --- | --- | --- |
| Classification | Average | Tolerance | Average | Tolerance |
| First sintered body | 10.185 | 0.006 | 14.786 | 0.015 |
| Second sintered body | 10.183 | 0.007 | 14.765 | 0.021 |

Comparative Example 1

IDR-UO$_2$ powder was preliminarily formed with a pressure of 0.1 ton/cm$^2$ into a mass, and the mass was crushed and allowed to pass through a 50-mesh sieve to fabricate granules. 0.3 wt % of zinc state was added as a lubricant to the fabricated granules, which was then mixed in a tubular mixer for 30 minutes.

The thusly mixed granules were charged (i.e., loaded) in a double acting uniaxial press and pressed with a pressure of about 4 ton/cm$^2$ to fabricate an annular green body. The inner and outer diameters of the annular green body were measured at intervals of 1 mm along the length of the green body by using a contact type three-dimensional measurement machine to obtain a dimensional tolerance. The annular green body without a rod-like shaped structure was sintered for 12 hours at a temperature of 1,600 degrees Celsius, in a hydrogen atmosphere.

The density of the sintered annular body was measured by using Archimedes' method, and inner and outer diameters of the sintered annular body were obtained by using a contact type three-dimensional measurement machine.

The density of the sintered annular body was about 96% of a theoretical density, like the Embodiment. The inner diameters, outer diameters, and tolerances of the annular sintered body according to Comparative Example 1 are shown in Table 2 below.

As noted in Table 2, the inner diameter dimensional tolerance of the sintered annular body according to the related art method for fabricating a sintered annular body is ±20 μm larger than that of the sintered annular body according to the present invention. It can be also noted that the variation of the inner diameters of the sintered bodies is large according to the results obtained by repeatedly fabricating the first and second sintered bodies, and so on. Namely, the sintered annular body according to the comparative example needs inner side grinding in order to obtain the inner diameter and the inner diameter dimensional tolerance in the specifications of the sintered nuclear fuel pellet.

TABLE 2

| Classification | Inner diameter (mm) | | Outer diameter (mm) | |
| --- | --- | --- | --- | --- |
| | Average | Tolerance | Average | Tolerance |
| First sintered body | 10.146 | 0.023 | 14.735 | 0.030 |
| Second sintered body | 10.173 | 0.022 | 14.758 | 0.029 |
| Third sintered body | 10.140 | 0.020 | 14.727 | 0.029 |

Comparative Example 2

IDR-UO$_2$ powder was preliminarily formed with a pressure of 0.1 ton/cm$^2$ into a mass, and the mass was crushed and allowed to pass through a 50-mesh sieve to fabricate granules. 0.3 wt % of zinc state was added as a lubricant to the fabricated granules, which was then mixed in a tubular mixer for 30 minutes.

The thusly mixed granules were charged (i.e., loaded) in a double acting uniaxial press and pressed with a pressure of about 4 ton/cm$^2$ to fabricate an annular green body. The inner and outer diameters of the annular green body were measured at intervals of 1 mm along the length of the green body by using a contact type three-dimensional measurement machine.

The annular green body with a W rod having an outer diameter of 10.18 mm inserted therein was sintered for 12 hours at a temperature of 1,600 degrees Celsius in a hydrogen atmosphere. It was seen that the sintered annular body was broken during the sintering operation, which is considered to result from the fact that the coefficient of thermal expansion (~4.5×10$^{-6}$/K) of the W rod was smaller than the coefficient of thermal expansion (~9.8×10$^{-6}$/K) of the sintered nuclear fuel pellet, applying tensile stress to the sintered annular body during a cooling operation to cause a crack to the sintered annular body.

Figure 6:
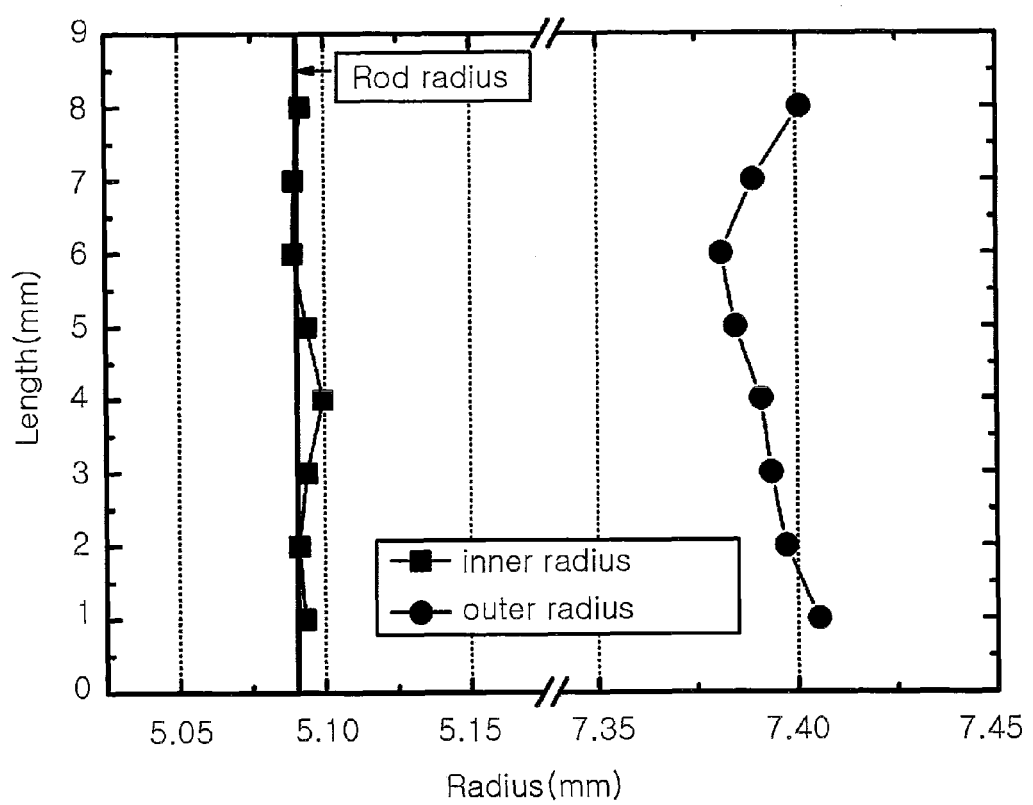
FIG. 6 is a graph showing the results obtained by measuring an inner radius and an outer radius over the direction of a central axis of the sintered annular pellet according to Embodiment of the present invention.
Figure 7:
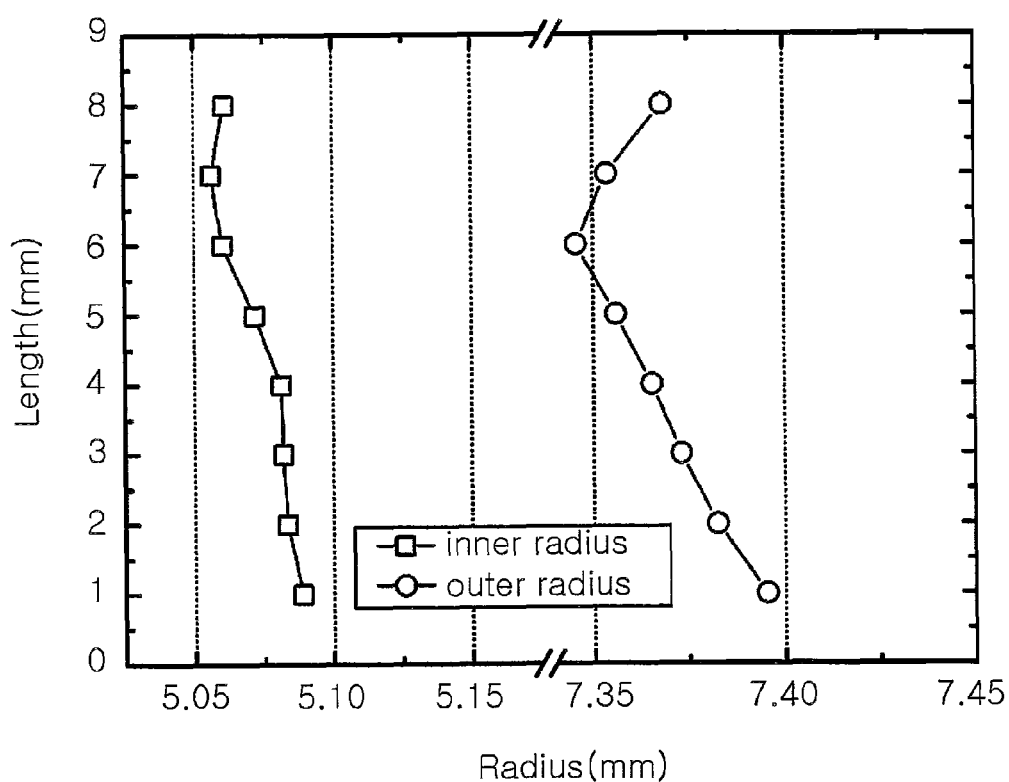
FIG. 7 is a graph showing the results obtained by measuring an inner radius and an outer radius over the direction of a central axis of the sintered annular pellet according to Comparative Example 1 of the present invention.

FIGS. 6 and 7 are graphs showing the results obtained by measuring an inner radius and an outer radius over the direction of a central axis of the sintered annular pellet according to the Embodiment and Comparative example 1.

As shown in FIG. 6, it is noted that, after the annular green body fabricated according to the Embodiment was sintered in the hydrogen atmosphere for 12 hours at the temperature of 1,600 degrees Celsius, the inner diameters of the sintered annular body have all the uniform value along the length of the sintered body, and thus, the inner diameter dimensional tolerance is a value of ±13 μm or smaller.

In comparison, in the case of the sintered annular body obtained by sintering the annular green body, which was fabricated according to Comparative example 1, in the hydrogen atmosphere for 12 hours at the temperature of 1,600 degrees Celsius, the inner diameter and the outer diameter vary along the length of the sintered body as shown in FIG. 7, having a large dimensional tolerance.

As set forth above, according to exemplary embodiments of the invention, sintered annular nuclear fuel pellets having a uniform inner diameter can be fabricated, and a uniform inner diameter distribution over the length of a single sintered annular nuclear fuel pellet can be maintained. In particular, an inner diameter dimensional tolerance can be lowered to below 13 μm without performing a grinding process on the sintered pellet. Thus, the inner and outer gaps of the annular nuclear fuel rod can be more precisely adjusted without any additional processing procedure, and in addition, a method for resolving the problem of an imbalance in the heat flux of the annular nuclear fuel rod can be realized.

Eventually, the stability of the annular nuclear fuel rod can be improved. In addition, in terms of the fabrication cost, the process of grinding the inner surface is not required, so grinding remnants otherwise generated during grinding can be reduced, and the amount of enriched uranium to be recycled can be reduced to contribute to improvement of productivity.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for fabricating a sintered annular nuclear fuel pellet, the method comprising:
    pressing nuclear fuel powder or granule to fabricate an annular nuclear fuel green body;
    inserting a rod-like shaped structure into the annular nuclear fuel green body;
    sintering the rod-like shaped structure-inserted annular nuclear fuel green body in a reductive gas atmosphere; and
    separating the sintered annular nuclear fuel pellet from the rod-like shaped structure,
    wherein a diameter of the rod-like structure is less than an inner diameter of the annular nuclear fuel green body and is equal to or greater than a largest inner diameter of the sintered annular nuclear fuel pellet without the rod-like structure inserted therein, and
    wherein the rod-like structure has a coefficient of thermal expansion which is equal to or greater than that of the sintered annular nuclear fuel pellet wherein the rod-like structure maintains substantially the same diameter as that before the sintering.

2. The method of claim 1, wherein the annular nuclear fuel green body has a green density distribution changing in an axial direction.

3. The method of claim 1, wherein the rod-like structure has a coefficient of thermal expansion ranging from 9.0×10$^{-6}$/K to 15.0×10$^{-6}$/K under conditions of the sintering.

4. The method of claim 1, wherein the rod-like structure comprises a material selected from the group consisting of UO$_2$, ThO$_2$, PuO$_2$, and MgO.

5. The method of claim 1, further comprising:
performing centerless-grinding on an outer surface of the separated annular nuclear fuel pellet such that the annular nuclear fuel pellet has a uniform outer diameter in an axial direction.

6. The method of claim 1, wherein the reductive gas is a hydrogen gas.

7. The method of claim 1, wherein the reductive gas is a mixture of gases obtained by mixing at least one selected from the group consisting of carbon dioxide, water vapor, and an inert gas with a hydrogen gas.

8. The method of claim 1, wherein the sintering is performed at a temperature ranging from 1,500 degrees Celsius to 1,800 degrees Celsius.

9. The method of claim 1, wherein the nuclear fuel powder or granule is a ceramic material comprising one or more fissile materials selected from the group consisting of uranium, plutonium, and thorium.

\* \* \* \* \*

UNITED STATES PATENT AND TRADEMARK OFFICE
CERTIFICATE OF CORRECTION

PATENT NO. : 8,557,148 B2  
APPLICATION NO. : 12/871347  
DATED : October 15, 2013  
INVENTOR(S) : Young-Woo Rhee et al.

Page 1 of 1

It is certified that error appears in the above-identified patent and that said Letters Patent is hereby corrected as shown below:

On the Title page of the Patent, Item (75) Inventors, Column 1, Line 4, delete "Ki-Won Kang, Daejeon (KR); Chill-Sun Ryu, legal representative, Daejeon (KR);" and insert -- Ki-Won Kang, (Deceased) Daejeon (KR); Chill-Sun Ryu, legal representative, Daejeon (KR); --

Signed and Sealed this
Twenty-fifth Day of February, 2014

Michelle K. Lee
*Deputy Director of the United States Patent and Trademark Office*